United States Patent
Sado (10) Patent No.: US 7,961,578 B2
(45) Date of Patent: Jun. 14, 2011

(54) METHOD AND APPARATUS FOR GENERATING SYNCHRONOUS CLOCK FOR WRITE OPERATION IN A DISK DRIVE

(75) Inventor: Hideo Sado, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 398 days.

(21) Appl. No.: 12/145,903

(22) Filed: Jun. 25, 2008

(65) Prior Publication Data

US 2009/0003165 A1    Jan. 1, 2009

(30) Foreign Application Priority Data

Jun. 29, 2007  (JP) ................. 2007-173273

(51) Int. Cl.
*G11B 7/00*  (2006.01)

(52) U.S. Cl. ............... 369/53.34; 369/53.31; 369/53.35; 369/47.28; 369/47.27

(58) Field of Classification Search ............... 369/53.35, 369/43.27
See application file for complete search history.

(56) References Cited

U.S. PATENT DOCUMENTS

| | | | | |
|---|---|---|---|---|
| 5,694,380 A * | 12/1997 | Shimizume et al. | ....... | 369/47.45 |
| 6,324,027 B1 | 11/2001 | Chainer et al. | | |
| 6,366,077 B1 * | 4/2002 | Kim | ............... | 324/177 |
| 7,088,534 B2 | 8/2006 | Sutardja | | |
| 2004/0120068 A1 * | 6/2004 | Koyanagi | ........... | 360/75 |
| 2005/0117477 A1 * | 6/2005 | Kajino et al. | ............ | 369/47.36 |
| 2006/0176599 A1 * | 8/2006 | Semba | ............ | 360/51 |

FOREIGN PATENT DOCUMENTS

| | | |
|---|---|---|
| JP | 02-218059 | 8/1990 |
| JP | 2001-126250 | 5/2001 |
| JP | 2001-216648 | 8/2001 |

* cited by examiner

*Primary Examiner* — Lixi Chow
(74) *Attorney, Agent, or Firm* — Pillsbury Winthrop Shaw Pittman, LLP (57) ABSTRACT

According to one embodiment, a disk drive configured to write data to a disk being rotated by a spindle motor has a synchronous clock generator that generates a synchronous clock to use during the write operation. The synchronous clock generator inputs the rotational acceleration of the spindle motor, as feed-forward control value, to the feedback control system provided in the drive disk, thereby generating a clock that is synchronous with the rotational speed of the disk.

11 Claims, 5 Drawing Sheets

METHOD AND APPARATUS FOR GENERATING SYNCHRONOUS CLOCK FOR WRITE OPERATION IN A DISK DRIVE

CROSS-REFERENCE TO RELATED APPLICATIONS

This application is based upon and claims the benefit of priority from Japanese Patent Application No. 2007-173273, filed Jun. 29, 2007, the entire contents of which are incorporated herein by reference.

BACKGROUND

1. Field

One embodiment of the present invention relates to a disk drive. More particularly, the invention relates to a technique of generating a synchronous clock for the write operation in a disk drive.

2. Description of the Related Art

In most disk drives, a representative example of which is a hard disk drive, the head performs a write operation to record data on a disk that is a magnetic recording medium, and performs a read operation to reproduce the data from the disk.

A write clock synchronous with the rotational speed of the disk (hereinafter referred to as a synchronous clock) is used in order to write data in the write operation performed by the write head that is included in the head. In normal operation, a spindle motor rotates the disk at a constant speed.

Two types of write operations are performed in the disk drive. One type is performed to write user data to the disk. The other type is performed to write servo data to the disk during the manufacture of the disk drive. The servo data is data that is used to control the positioning of the head over the disk, and is recorded in the servo sectors provided on the disk. In either type of write operation, a sync-clock generator that generates a synchronous clock must be used.

The sync-clock generator must be feedback-controlled to adjust the clock frequency and the like, in order to generate a clock that is synchronous with the rotational speed of the disk. Hitherto, the clock frequency has been adjusted by some methods. In one method, the time interval between any two adjacent servo sectors is measured by using servo-sync marks recorded in these servo sectors, and then the frequency of the synchronous clock is adjusted in accordance with the time intervals thus measured. (See, for example, U.S. Pat. No. 7,088,534.) In another method, the time interval between the trigger patterns recorded in the disk is measured, and then the phase of the synchronous clock is adjusted in accordance with the time intervals thus measured. (See, for example, U.S. Pat. No. 6,324,027.)

Both conventional methods specified above can indeed generate a clock that is synchronous with the rotational speed of the disk. In these methods, however, no controls based on the controllability of the spindle motor that rotates the disk are performed at all. Consequently, the rotational speed of the disk greatly changes the moment the spindle motor is accelerated and decelerated. Inevitably, the synchronous clock cannot be adjusted, faithfully in accordance with the rotational speed of the disk changes.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided a disk drive in which controls are performed based on the controllability of the spindle motor and a clock that is very synchronous with the rotational speed of the disk can thereby be generated.

(Configuration of the Disk Drive)

Figure 1:
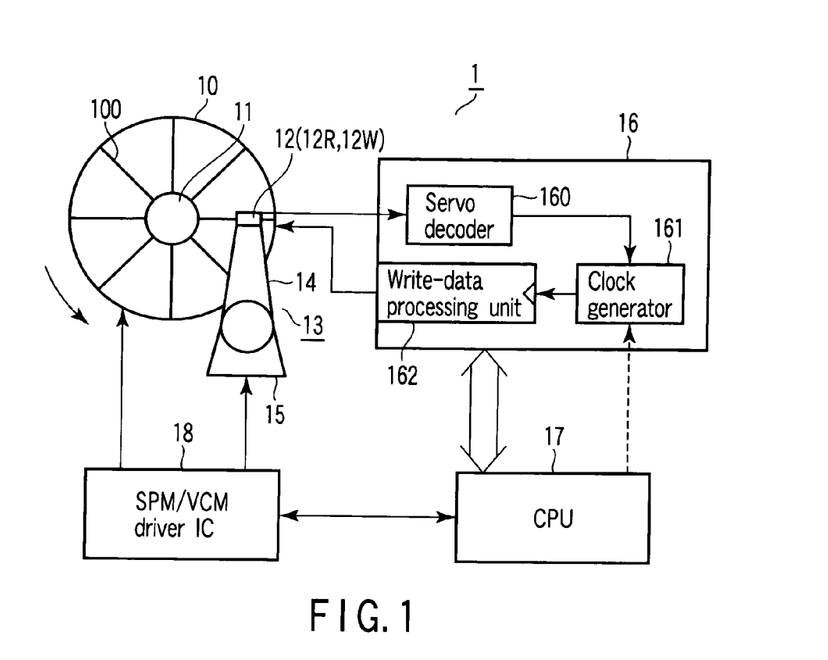
FIG. 1 is a block diagram showing the major components of a disk drive according to an embodiment of the present invention.

According to an embodiment, FIG. 1 is a block diagram showing the major components of a disk drive according to an embodiment of the present invention.

As FIG. 1 shows, the disk drive 1 has a disk 10, a spindle motor (SPM) 11, a head 12, a read/write channel 16, a microprocessor (CPU) 17, and a motor driver 18. The SPM 11 rotates the disk 10. Servo sectors 100 are provided on the disk 10. The servo sectors 100 are arranged at regular intervals circumferentially, each extending radially. In each servo sector 100, servo data is recorded, which is used to control the positioning of the head 12.

The head 12 has a write head (write element) 12W and a read head (read element) 12R, which are spaced apart from each other. The write head 12W is provided to write user data to the disk 10. The read head 12R is provided to read the user data and the servo data from the disk 10. The head 12 is mounted on an actuator 13. As the actuator 13 can move, the head 12 is moved radially over the disk 10. The actuator 13 has an arm 14 and a voice coil motor (VCM) 15. The arm 14 holds the head 12, and the VCM 15 rotates the arm 14.

The read/write channel 16 is a signal-processing unit that processes read/write data and is connected to the head 12 via a head amplifier (not shown). The read/write channel 16 has a servo decoder 160, a synchronous clock generator 161, and a write-data processing unit 162. The disk drive 1 further comprises a read channel (not shown) that can reproduce the user data from the disk 10. Nonetheless, the components of this read channel will not be described.

The servo decoder 160 receives a read signal read by the read head 12R and decodes the signal, thereby extracting the servo data recording in the servo sectors 100 provided on the disk 10. The synchronous clock generator 161 is a component pertaining to the gist of the present embodiment. As will be described later, the synchronous clock generator 161 generates a synchronous clock, which is synchronous with the rotational speed of the disk 10, when it is feedback-controlled during the write operation. (Hereinafter, the synchronous clock may be called the "reference clock.") The synchronous clock is output to the write-data processing unit 162.

The write-data processing unit 162 is the main component of the write channel 16. The unit 162 converts the user data to record in the disk 10, to a write signal, by using the synchronous clock output from the synchronous clock generator 161. The write head 12W receives the write signal from the write-data processing unit 162 through a head amplifier (not shown) and writes the user data to the disk 10.

The CPU 17 is the main controller provided in the disk drive and controls the positioning of the head 12 and the synchronous clock generator 161 according to the present embodiment. The CPU 17 can change the parameters that are indispensable to the read/write channel 16 and SPM/VCM driver IC 18.

The SPM/VCM driver IC 18 is a driver IC comprising an SPM driver and a VCM driver that control the SPM 11 and the VCM 15, respectively. Controlled by the CPU 17, the VCM driver supplies the VCM 15 with a current for controlling the positioning of the head 12, thus driving the actuator 13. Controlled by the CPU 17, too, the SPM driver supplies the SPM 11 with a current for driving the SPM 11 at a constant speed. The SPM driver outputs a control signal, from which the CPU 17 calculates acceleration appropriate for the SPM 11.

The disk drive 1 further has a disk controller, which serves as an interface between the disk drive 1 and a host system (not shown). Since the disk controller does not pertain to the gist of this invention, it is not described or shown.

(SPM Control System)

Figure 2:
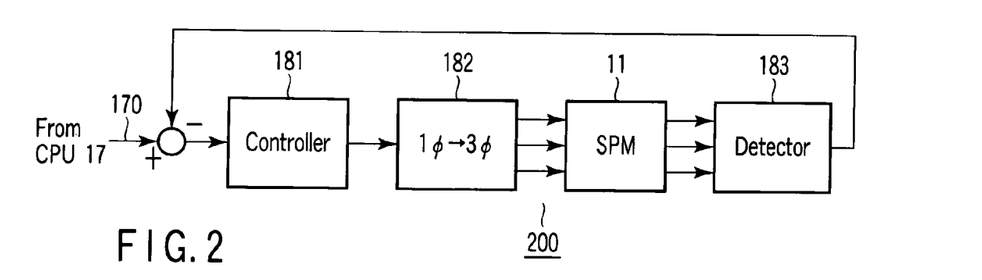
FIG. 2 is a block diagram explaining an SPM control system according to the embodiment.

FIG. 2 is a block diagram explaining a control system for the spindle motor 11 (i.e., SPM control system) according to the present embodiment.

As in most disk drives, the spindle motor 11 is a brushless DC motor. As FIG. 2 shows, the main component of the SPM control system is the SPM driver incorporated in the SPM/VCM driver IC 18. The SPM control system is a feedback control system that has a controller 181, a one-phase/three-phase converter 182, and an SPM-speed detector (or rotation-phase detector) 183.

In the SPM control system, the SPM-speed detector 183 detects the speed of the SPM 11. The controller 181 controls the drive current supplied to the SPM 11, in order to compensate for the difference between the speed (control value) set by from the CPU 17 and the speed detected by the SPM-speed detector 183. Thus, the spindle motor 11 is repeatedly accelerated and decelerated and is finally driven at a constant speed.

(Synchronous-Clock Generating System)

Figure 3:
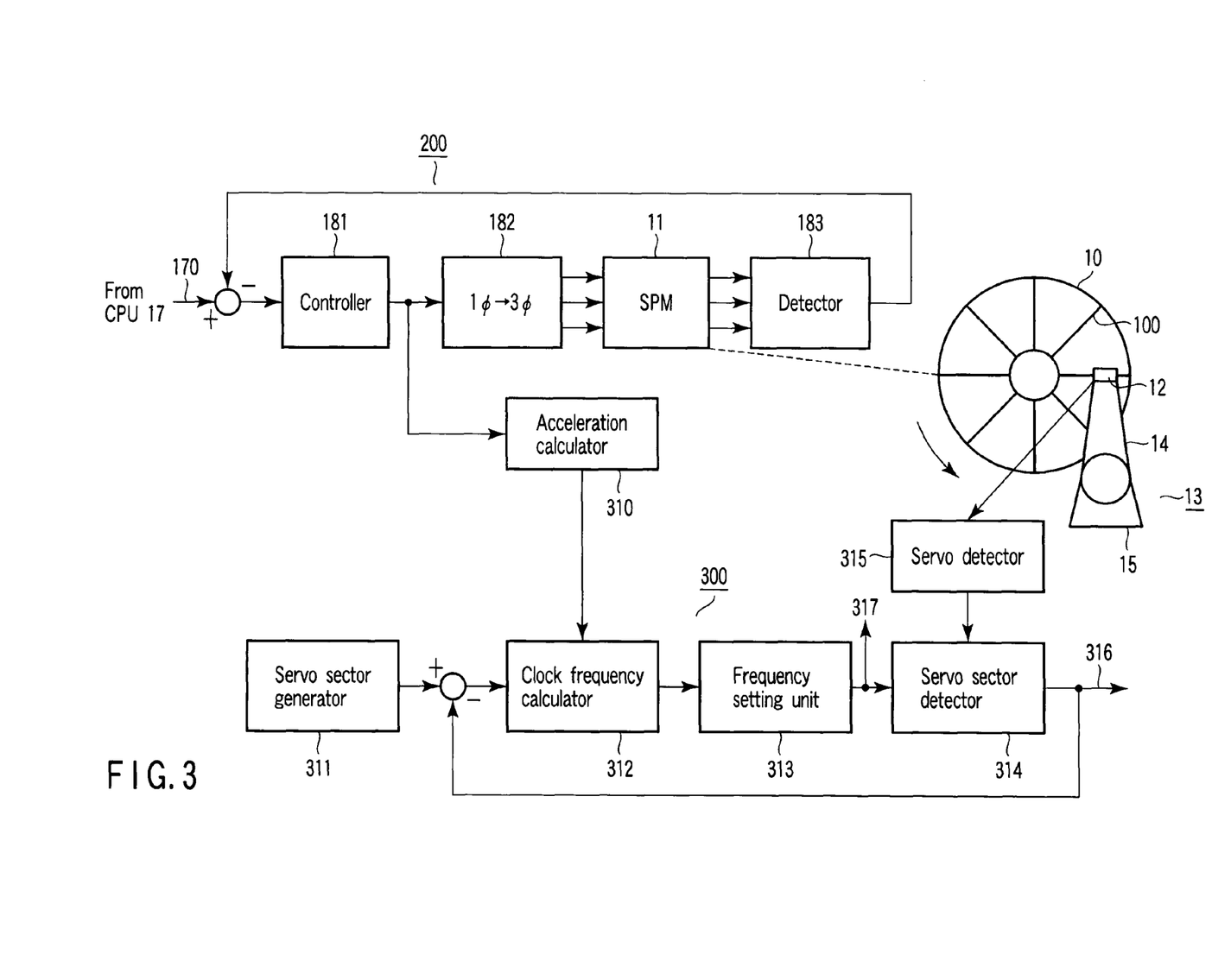
FIG. 3 is a block diagram explaining a synchronous-clock generating system according to the embodiment.

FIG. 3 is a block diagram explaining a synchronous-clock generating system 300 according to the present embodiment.

The synchronous-clock generating system 300 has a SPM control system 200 (see FIG. 2), an acceleration calculator 310, a servo sector generator 311, a clock frequency calculator 312, a frequency setting unit 313, and a servo sector detector 314. The servo sector generator 311 generates a theoretical value of time interval of the servo sectors. The servo sector detector 314 detects the time interval of the serve sectors.

The acceleration calculator 310 extracts a control signal (i.e., drive current) output from the controller 181 of the SPM control system 200 and calculates the rotational acceleration of the SPM 11 from this control signal. The acceleration calculator 310 comprises the CPU 17 and an analog-to-digital converter; it is configured to receive a current from the SPM driver and converts the current to a digital value, which is input to the CPU 17. Note that the CPU 17 may be designed to convert the current detected by the current sensor provided in the SPM driver or SPM 11 to a digital value, from which the rotational speed of the SPM 11 will be calculated.

Figure 4:
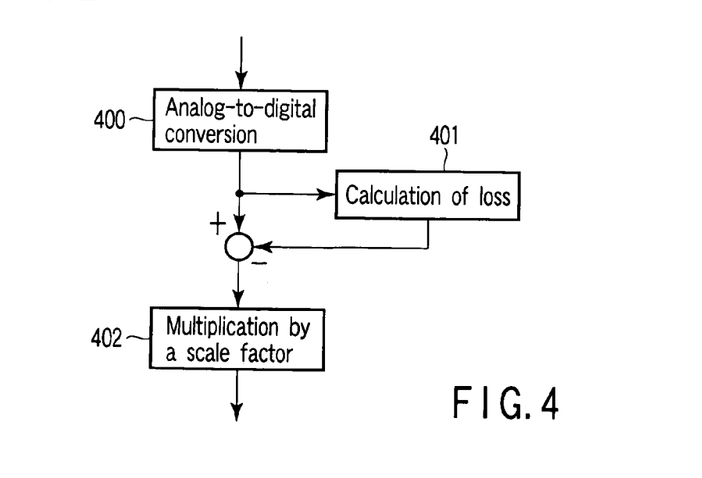
FIG. 4 is a block diagram explaining a method that the acceleration calculator performs in the embodiment in order to calculate acceleration.

FIG. 4 is a block diagram explaining a method in which the acceleration calculator 310 may calculate acceleration.

The acceleration calculator 310 (CPU 17) receives a control signal (current value) from the controller 181 and converts the signal to a digital value (Block 400). To find the average value of the control signal, the acceleration calculator 310 calculates a loss in the SPM 11 and subtracts the loss from the control signal (Block 401). The calculation of loss is a process of determining a time average of the output from the controller 181, over a long time (e.g., 1 second). Thus, the acceleration calculator 310 can acquires the value of the control signal, which is proportional to the rotational speed of the SPM 11. The acceleration calculator 310 then multiplies the value of the control signal (i.e., a value proportional to the rotational speed) by a scale factor, calculating the rotational acceleration of the SPM 11 (Block 402).

In the SPM control system 200 there exist some physical disturbances, such as counter-electromotive force and SPM viscosity resistance, which are proportional to the rotational speed of the SPM 11. Nevertheless, the rotational speed of the SPM 11 is controlled to a constant value in the disk drive 1. Hence, the physical disturbances can be regarded as constant in value. In consideration of these disturbances, the rotational acceleration (dw/dt) of the SPM 11 can be calculated as follows:

$$dw/dt = (Kt(V - Ktw)/R - Bw)/J = \qquad (1)$$
$$(Kt/R/JV) - (Kt^2/Rw) - (KtB/Jw) = (Kt/R/JV) - \text{constant}$$

where w is the rotational speed (rad/sec) of the SPM 11, Kt is torque constant, R is the SPM coil resistance, B is the SPM viscosity coefficient, V is the voltage supplied to SPM, and J is the SPM inertia. Note that "constant" is a constant applied.

In the synchronous-clock generating system 300, the clock frequency calculator 312 finds the frequency (or clock-phase shift) of the synchronous clock (write clock) from the rotational acceleration of the SPM 11, which has been calculated by the acceleration calculator 310. All functions of the synchronous-clock generating system 300, except those of the acceleration calculator 310, servo sector generator 311 and servo detector 315, are included in the synchronous clock generator 161 that is shown in FIG. 1.

Figure 5:
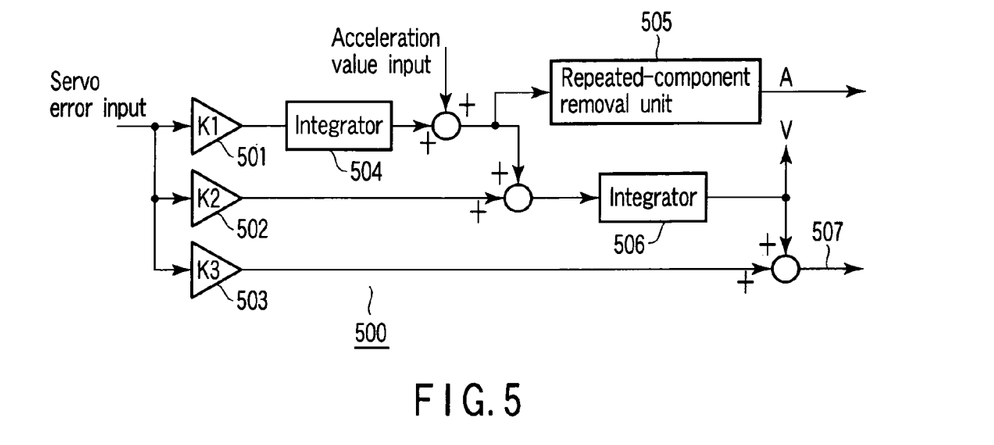
FIG. 5 is a block diagram explaining the major components of the synchronous clock generator according to the embodiment.

FIG. 5 is a block diagram explaining the components of the synchronous clock generator 161.

The synchronous clock generator 161 includes a synchronous clock controller 500 that has amplifiers 501 to 503, first and second integrators 504 and 506, and a repeated-component removal unit 505 all shown in FIG. 5. The amplifiers 501 to 503 adjust gains k1 to k3. In the synchronous clock generator 161, the amplifiers 501 to 503 receive an input (servo-error input) which represents a difference between the theoretical value of servo-sector time interval and the actual servo-sector time interval given by the. Note that the theoretical and actual servo-sector time intervals have been output from the servo sector generator 311 and the servo sector detector 314, respectively, as is illustrated in FIG. 3.

The servo sector detector 314 detects the servo-sector time interval from the servo data output from the servo detector 315, by using the clock of the frequency that the frequency setting unit 313 has set. The servo detector 315 is a component equivalent to the servo decoder 160 shown in FIG. 1. The servo detector 315 reproduces the servo data recorded in servo sector 100, from the signal the read head 12R has read from the servo sector 100.

The first integrator 504 integrates the servo-error input, outputting a state value that corresponds to the rotational acceleration of the disk 10. The second integrator 506 receives a sum of the output of the first integrator 504 and the output of the acceleration calculator 310, i.e., acceleration value (acceleration input), and outputs a state value V that corresponds to the rotational speed of the disk 10.

The rotation of the disk 10 may fluctuate, resulting in a disk shift. In this case, the time interval between any two adjacent servo sectors inevitably differs from the time interval between any other two adjacent servo sectors. To compensate for the rotational fluctuation of the disk, a signal having the rotational frequency of the disk 10 and a signal of a harmonic of the rotational frequency are applied to the output of the first integrator 504. From the output of the first integrator 504, the repeated-component removal unit 505 removes the component repeated as the disk 10 rotates. A state value A (angular acceleration) corresponding to the rotational acceleration of the disk 10 can therefore be acquired. Thus, the acceleration of the SPM 11 can be estimated from the output A of the repeated-component removal unit 505. Moreover, the rotational speed of the SPM 11 can be estimated from the output V of the second integrator 506.

The clock frequency calculator 312 included in the synchronous clock generator 161 calculates the frequency of the synchronous clock that corresponds to the state value A and a state value 507, both acquired from the synchronous clock controller 500 shown in FIG. 5. The state value A and the state value 507 correspond to the rotational acceleration rotational speed of the disk 10, respectively. At this point, the clock frequency calculator 312 receives the acceleration value of the SPM 11 from the acceleration calculator 310, as feed-forward control input. Using the feed-forward control input, the calculator 312 compensate for the rotational fluctuation of the disk 10 resulting from the acceleration or deceleration of the SPM 11.

Based on the frequency calculated by the clock frequency calculator 312, the synchronous clock generator 161 generates a synchronous clock (write clock) 317 having the frequency set by the frequency setting unit 313. The synchronous clock thus generated is output to the write-data processing unit 162 shown in FIG. 1.

Thus, in the disk drive 1 according to the present embodiment, the synchronous clock generator 161 generates a clock (write clock) 317 that is synchronous with the rotational speed of the disk 10, by means of the feed-forward control, in accordance with the servo-sector time interval detected by the servo decoder 160 (more precisely, servo detector 315).

During the data-write operation, the synchronous clock generator 161 keeps supplying the synchronous clock (write clock) to the write-data processing unit 162. The disk drive 1 can therefore write user data to the disk 10 at the frequency that is synchronous with the rotational speed of the disk 10.

Further, the synchronous clock generator 161 receives, as feed-forward control value, the acceleration value of the SPM 11 (i.e., output of the CPU 17, indicated by a broken line in FIG. 1), which has been calculated by the acceleration calculator 310. From the acceleration value, the synchronous clock generator 161 generates a synchronous clock (write clock) in which the rotational fluctuation of the disk 10 has been compensated for.

The rotational fluctuation of the disk 10 has resulted from the controllability of the SPM 11. More precisely, this fluctuation develops the moment the SPM 11 is accelerated and decelerated. The acceleration calculator 310 calculates the acceleration of the SPM 11 from the control signal supplied from the SPM control system 200 configured to drive the SPM 11 at a constant speed. The synchronous clock generator 161 receives the acceleration value of the SPM 11 as feed-forward control value. Using the acceleration value, the synchronous clock generator 161 can compensate for the rotational fluctuation of the disk 10. Hence, it can generate a clock that remains very synchronous with the rotational speed of the disk 10, even if the rotation of the disk 10 fluctuates.

How a synchronous clock is generated in the disk drive 1 according to this embodiment to write the user data to the disk 10 has been described. A synchronous clock can be generated in the same way in order to write servo data to the disk 10. More specifically, the servo data can be recorded in the disk 10 as the disk drive 1 performs self-servo-data writing during the manufacture of the disk drive 1. In this case, the synchronous clock generator 161 reads the reference signals from the disk 10, not the servo-sector time interval, and generates a clock (write clock) synchronous with the rotational speed of the disk 10, on the basis of the time intervals of the reference signals.

The acceleration calculator 310 can calculate the acceleration of the SPM 11 in various methods. It may calculate the acceleration from the measured value of the current supplied to the SPM 11. Alternatively, it may calculate the acceleration from the inter-terminal voltage of the SPM 11. Still alternatively, it may find the acceleration from the value obtained by subtracting the DC component from the current supplied to the SPM 11.

The scale factor (FIG. 4) applied in the acceleration calculator 310 may be determined from the ratio of the AC component of the current supplied to the SPM 11 to the acceleration value acquired from the frequency setting unit 313.

As has been described, the present embodiment can provide a disk drive in which controls are performed based on the controllability of the spindle motor and a clock that is very synchronous with the rotational speed of the disk can thereby be generated.

(Method of Calculating the Scale Factor)

A specific method of calculating the scale factor in the acceleration calculator 310 will be explained with reference to FIGS. 6 to 10. Most components shown in FIGS. 6 to 10 are identical to those shown in FIG. 4. Therefore, any component that performs the same function as its counterpart shown in FIG. 4 is designated by the same reference number and will not be describe.

In theory, the acceleration calculator 310 can uniquely determine the acceleration of the SPM 11 by multiplying the control signal by a scale factor given as: V_AD/reso/R*Kt/J/w*F, where V_AD is a voltage range for the analog-to-digital converter 400, reso is a resolution range for the analog-to-digital converter 400, and F is the reference clock frequency.

Figure 6:
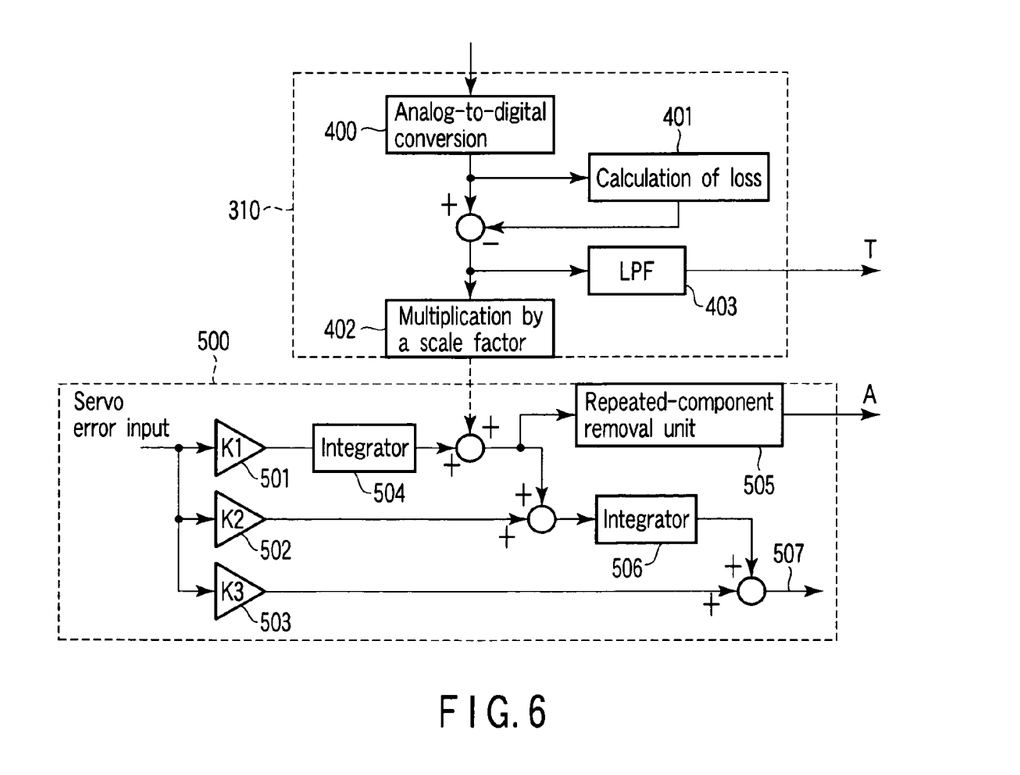
FIG. 6 is a block diagram explaining a first example of the acceleration calculator according to the embodiment.

FIG. 6 is a diagram depicting a first example of the acceleration calculator 310.

As FIG. 6 shows, the acceleration calculator 310 has a low-pass filter (LPF) 403. The LPF 403 has the same controllability as can be achieved by the control signal (rotation-acceleration signal) supplied from the SPM control system 200. The LPF 403 outputs an acceleration-state value (T).

Strictly speaking, the acceleration-state value (T) contains a component pertaining to clock-synchronization controllability. This is because the synchronous-clock generating system 300 has a control band. Let K/s be the characteristic the system 300 has for the servo-sector time interval after the reference clock frequency has been set, and let the coefficients K1, K2 and K3 shown in FIG. 5 be $-(\omega^3)/K$, $3*(\omega^2)/K$ and $-3*\omega/K$, respectively, wherein omega is the cutoff frequency (rad/sec) of LPF. Then, the clock-synchronization controllability can be expressed as: $(\omega/(s+\omega))^3$.

The ratio of the output T of the LPF 403 to the state value A output by the synchronous clock controller 500 is found, thereby calculating a scale factor. The scale factor can be accurate if it is set to 0 at the initial state of learning.

Figure 7:
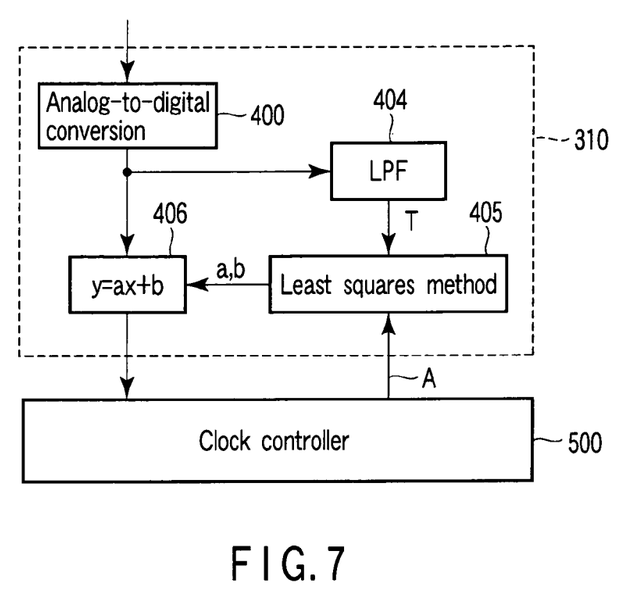
FIG. 7 is a block diagram explaining a second example of the acceleration calculator according to the embodiment.

FIG. 7 is a diagram showing a second example of the acceleration calculator 310.

The second example is an acceleration calculator 310 configured to find both a scale factor and an SPM loss at the same time. This acceleration calculator 310 has an operation unit 406 and an estimation unit 405. The operation unit 406 performs an operation of y=ax+b. The estimation unit 405 performs the least squares method, estimating coefficients a and b that involve in this operation. Alternatively, the estimation unit 405 may perform sequential least-squares method or fixed trace method, thereby to estimate these coefficients.

The operation unit 406 may use, as x involving the operation, a value obtained by passing the control signal generated by the SPM control system 200 through a LPF 404 (without filtering out the SPM loss). In this case, y is the state value A output by the synchronous clock controller 500.

Figure 8:
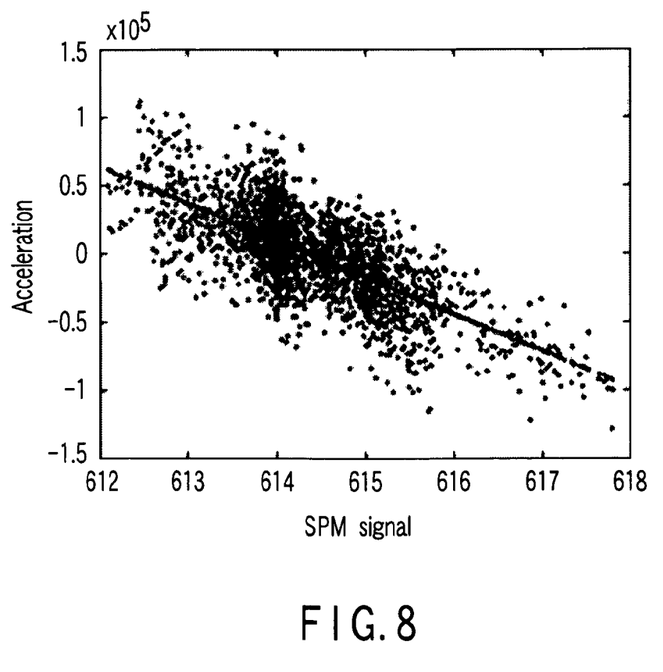
FIG. 8 is a graph representing a characteristic of the acceleration calculator according to the embodiment.

FIG. 8 is a graph representing a relation between the output T of the LPF 403a and the state value A output from the synchronous clock controller 500 and also showing the result of the least squares method the estimation unit 405 has performed.

Figure 9:
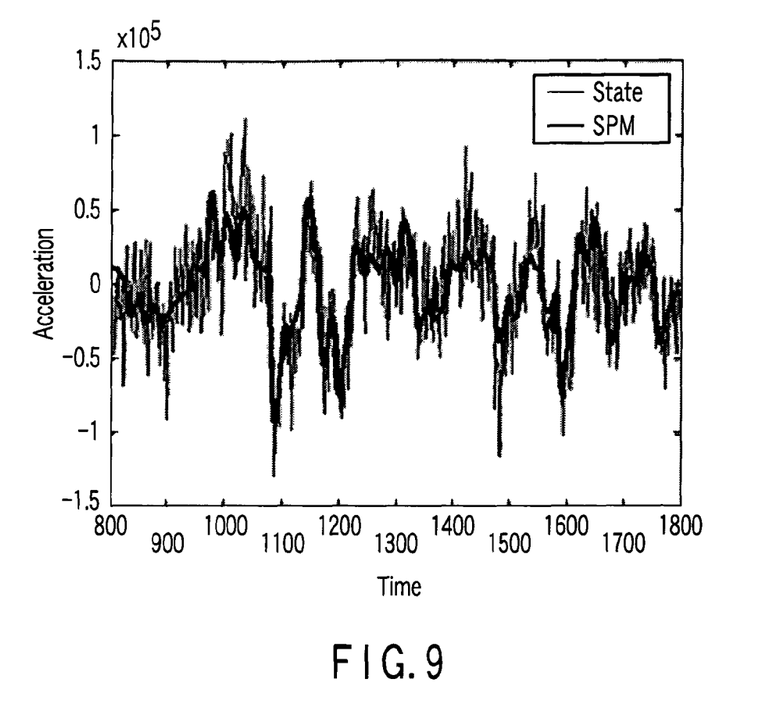
FIG. 9 is a graph representing another characteristic of the acceleration calculator according to the embodiment.
Figure 10:
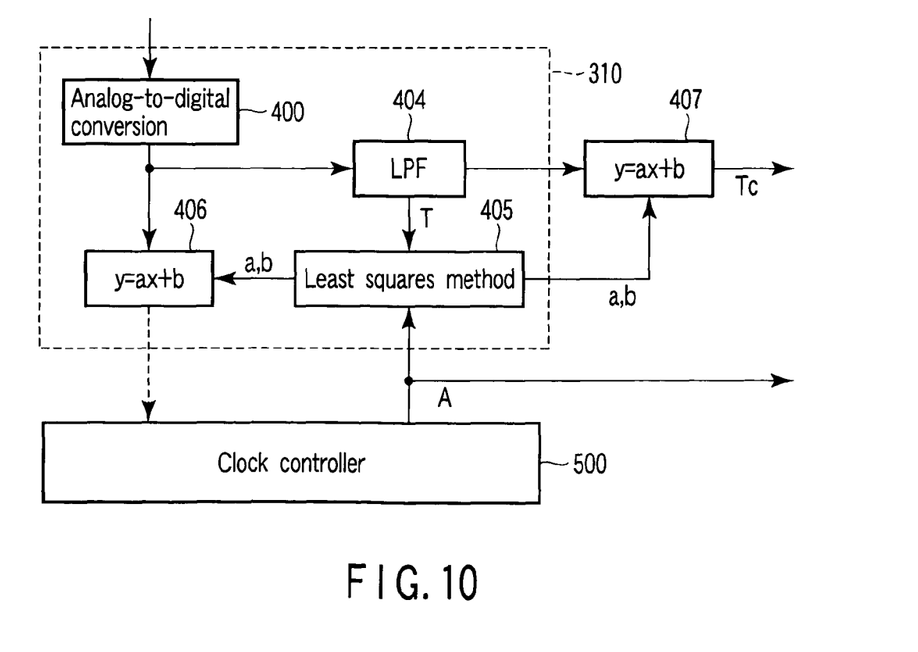
FIG. 10 is a block diagram explaining a third example of the acceleration calculator according to the embodiment.

FIG. 10 is a block diagram depicting a configuration having a display 407 that displays the output of the operation unit 406 provided in the acceleration calculator 310 shown in FIG. 7. FIG. 9 is a graph demonstrating the accuracy of the scale factor calculated. More precisely, it shows how the state of output (Tc) and the acceleration A of the SPM 11 change with time. As seen from FIG. 9, the output (Tc) and the acceleration A changes with time, almost in the same way.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A disk drive comprising:
    a detecting unit configured to detect reference signals of servo sectors read from a disk being rotated by a spindle motor;
    a spindle-motor controlling unit configured to perform a feedback control on the spindle motor;
    an acceleration calculating unit configured to calculate a rotational acceleration of the spindle motor, using a control signal output from the spindle-motor controlling unit; and
    a synchronous-clock generating unit configured to generate a synchronous clock for use in writing the data, from the reference signals detected by the detecting unit and the rotational acceleration calculated by the acceleration calculating unit, wherein
    the acceleration calculating unit is configured to acquire the value of the control signal which is proportional to the rotational speed of the spindle motor, thereby calculating the rotational acceleration.

2. The disk drive according to claim 1, wherein the detecting unit is configured to detect time intervals of servo sectors read from the disk and the synchronous-clock generating unit is configured to generate a synchronous clock for use in writing the data, from the time intervals.

3. The disk drive according to claim 2, wherein the synchronous-clock generating unit is configured to included:
    a feedback control unit which is configured to generate the synchronous clock from the time intervals detected by the detecting unit.

4. The disk drive according to claim 3, wherein the synchronous-clock generating unit is configured to include:
    an input unit which is configured to input the rotational acceleration calculated by the acceleration calculating unit, as a feed-forward control value, to the feedback control unit.

5. The disk drive according to claim 1, wherein reference signals are recorded in the disk, at predetermined intervals, to be used in writing servo data that is used to control the positioning of the head with respect to the disk, the detecting unit detects time intervals of the reference signals from the reference signals read by a head from the disk while the disk is being rotated by the spindle motor.

6. The disk drive according to claim 5, wherein the synchronous-clock generating unit is configured to generate a synchronous clock for writing the servo data, in accordance with the time intervals of reference signals and the rotational acceleration.

7. The disk drive according to claim 1, which further comprises a write channel configured to supply a write signal corresponding to the data, to a write head included in the head during a write operation in order to write user data or servo data to the disk, and in which the synchronous-clock generating unit outputs the synchronous clock to the write channel.

8. A disk drive comprising:
    a detecting unit which is configured to detect reference signals of servo sectors read from a disk being rotated by a spindle motor; and
    a synchronous-clock generating unit which is configured to generate a synchronous clock for use in writing the data, from the reference signals detected by the detecting unit,
    an acceleration calculating unit configured to calculate a rotational acceleration of the spindle motor, wherein
    the synchronous-clock generating unit which is configured to generate a synchronous clock for use in writing the data, from the reference signals detected by the detecting unit and the rotational acceleration calculated by the acceleration calculating unit, and
    the acceleration calculating unit is configured to calculate the rotational acceleration by using a current value measured of a current flowing in the spindle motor, a value obtained by subtracting a DC component from the current value, a value obtained by performing three-phase, one-phase conversion on the current value and then by removing a DC component from the current value thus converted, or an inter-terminal voltage of the spindle motor.

9. A method of generating a synchronous clock for a write operation in a disk drive, the method comprising:
  detecting reference signals of servo sectors, read from a disk being rotated by a spindle motor;
  performing a feedback control on the spindle motor, and in which the using a control signal output from a spindle-motor controlling unit;
  calculating a rotational acceleration of the spindle motor, using the control signal; and
  generating a synchronous clock for use in writing the data, from the reference signals and the rotational acceleration, wherein
the calculating includes acquiring the value of the control signal which is proportional to the rotational speed of the spindle motor, thereby calculating the rotational acceleration.

10. The method according to claim 9, wherein the detecting is configured to detect time intervals of servo sectors read from the disk, and the generating is configured to generate the synchronous clock from the time intervals.

11. The method according to claim 9, wherein the generating of the synchronous clock is configured to include:
  Inputting a signal representing the rotational acceleration, as a feed-forward control value, to a feedback control unit which generates the synchronous clock from time intervals of servo sectors.

* * * * *